United States Patent
Eliáš et al.

(10) Patent No.: US 9,552,260 B2
(45) Date of Patent: Jan. 24, 2017

(54) USING AN OBJECT RETAIN BLOCK IN A VIRTUAL MACHINE

(71) Applicant: Red Hat, Inc., Raleigh, NC (US)

(72) Inventors: Filip Eliáš, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 103 days.

(21) Appl. No.: 14/293,996

(22) Filed: Jun. 2, 2014

(65) Prior Publication Data
US 2015/0347240 A1 Dec. 3, 2015

(51) Int. Cl.
*G06F 11/07* (2006.01)
*G06F 11/14* (2006.01)
*G06F 9/45* (2006.01)
*G06F 9/44* (2006.01)

(52) U.S. Cl.
CPC ............ *G06F 11/1464* (2013.01); *G06F 8/41* (2013.01); *G06F 9/44* (2013.01); *G06F 11/1405* (2013.01); *G06F 11/1469* (2013.01); *G06F 2201/805* (2013.01); *G06F 2201/815* (2013.01)

(58) Field of Classification Search
CPC .......................... G06F 11/0793; G06F 11/1484
USPC ..................................................... 714/15, 19
See application file for complete search history.

(56) References Cited

U.S. PATENT DOCUMENTS

| | | | |
|---|---|---|---|
| 2004/0034814 A1* | 2/2004 | Thompson | G06F 8/443 714/35 |
| 2006/0156157 A1* | 7/2006 | Haselden | G06F 11/0793 714/746 |
| 2008/0040385 A1* | 2/2008 | Barrall | G06F 17/30203 |
| 2012/0271799 A1* | 10/2012 | Barrall | G06F 17/30203 707/649 |
| 2014/0074808 A1* | 3/2014 | Barrall | G06F 17/30203 707/695 |
| 2014/0325116 A1* | 10/2014 | McKelvie | G06F 12/0246 711/103 |

OTHER PUBLICATIONS

Carlstrom, Brian D. et al. "Transactional Execution of Java Programs," Oct. 16, 2005, pp. 9-20, Proceedings of the Workshop on Synchronization and Concurrency in Object-Oriented Languages, San Diego, CA.

\* cited by examiner

*Primary Examiner* — Chae Ko
(74) *Attorney, Agent, or Firm* — Lowenstein Sandler LLP

(57) ABSTRACT

A method for using a retain block in application code executing on a virtual machine includes identifying an instruction in application code, the instruction pertaining to an object, determining the instruction is part of a retain block, prior to executing the instruction, determining whether the instruction is to cause the object to be modified, and when the instruction is to cause the object to be modified, storing data indicating a first state of the object in a retain block store and causing the first state of the object to be modified using a second state. Also, the method includes in response to an error occurring during an execution of the instruction, returning the object from the second state to the first state using the stored data.

19 Claims, 10 Drawing Sheets

USING AN OBJECT RETAIN BLOCK IN A VIRTUAL MACHINE

TECHNICAL FIELD

Aspects of the present disclosure relate to restoring a state of an object in response to an error occurred during an execution of an application, and in particular to utilizing an object retain block to restore a state of an object.

BACKGROUND

A JAVA virtual machine is a process virtual machine that can execute JAVA bytecode. The JVM has a system to handle errors called Exceptions. Exceptions can detect errors and react to situations where errors are detected. However, Exceptions do not allow for an application, and specifically objects in the application, to return to a state before the error occurred.

BRIEF DESCRIPTION OF THE DRAWINGS

Aspects of the present disclosure are illustrated by way of example, and not by way of limitation, and can be more fully understood with reference to the following detailed description when considered in connection with the figures.

DETAILED DESCRIPTION

Aspects of the present disclosure provide for the use of an object retain block by a virtual machine (VM). During the execution of application code in a JAVA virtual machine (JVM), the JVM modifies objects (e.g., data values). The modified objects are saved in a data store. When an error occurs during the execution of the application code, the original state of the object is lost (e.g., original data values), leaving only the modified objects (e.g., modified data values). This scenario may corrupt data and cause inconsistencies in the execution of an application.

Aspects of the present disclosure address the above-mentioned deficiencies via the use of an object retain block. For example, a virtual machine may identify an instruction in application code, the instruction pertaining to an object. The virtual machine may further determine that the instruction is part of a retain block, and may determine, prior to executing the instruction, the instruction would cause the object to be modified. When the instruction would cause the object to be modified, the virtual machine stores data indicating a first state of the object in a retain block store and causes the first state of the object to be modified using a second state. In response to an error occurring during an execution of the instruction, the virtual machine returns the object from the second state to the first state using the stored data.

Accordingly, aspects of the present disclosure allow objects in an application to return to their original state in which they had been before an error occurred during the execution of the application code.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
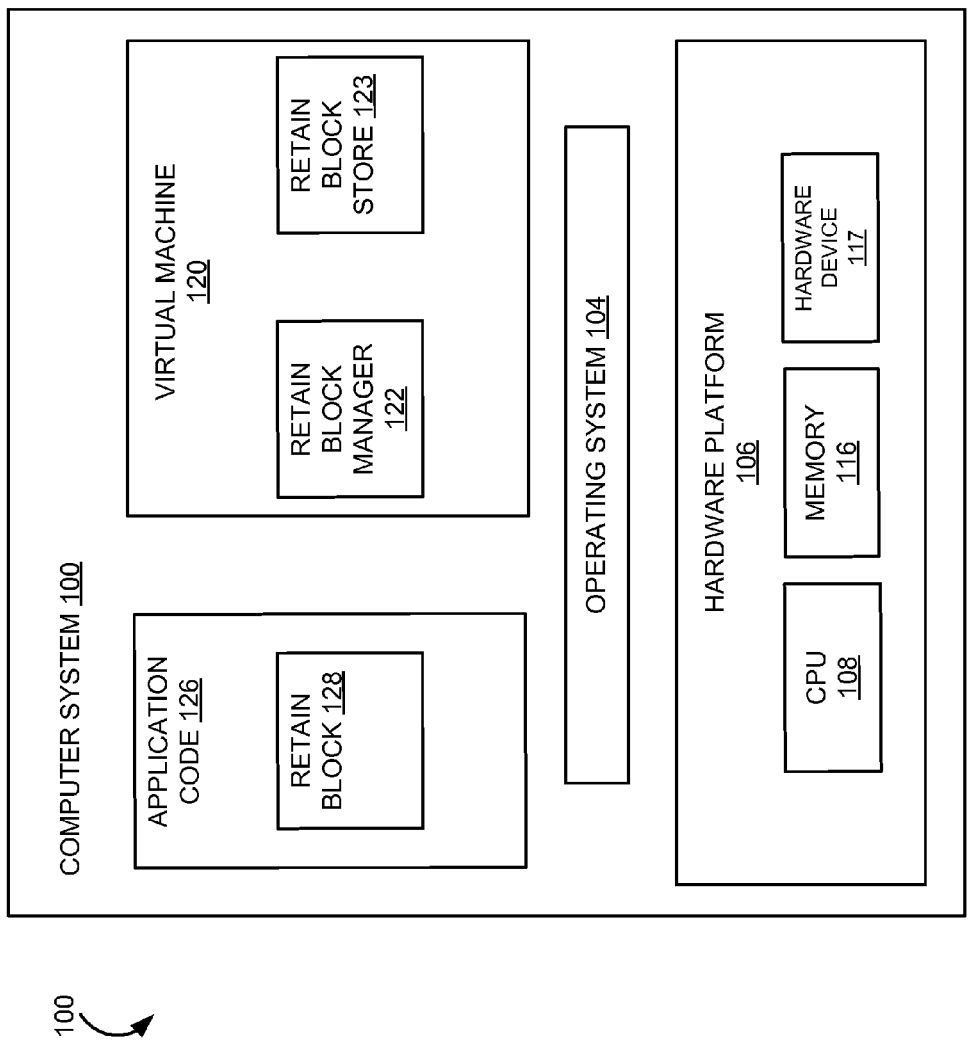
FIG. 1 is a block diagram of a system architecture in which example aspects of the disclosure may be implemented.

FIG. 1 is a block diagram of a system architecture in which aspects of the present disclosure can be implemented. The computer system 100 may be a server, a server cluster, a workstation, a personal computer (PC), a mobile device, a tablet computer, a laptop computer, or any other device, machine, or cluster of machines capable of hosting a virtual machine. The computer system 100 can be communicably connected to a network (not shown), such as a private network (e.g., a local area network (LAN), wide area network (WAN), intranet, etc.) or a public network (e.g., the Internet). Computer system 100 can include a hardware platform 106, an operating system 104 that executes on the hardware platform 106 and a virtual machine 120. Operating system (OS) 104 may be a Microsoft® Windows® OS, Linux® OS, Solaris® OS, Android® PS, Apple® iOS®, etc.

Hardware platform 106 may include one or more central processing units (CPU) 108, memory 116, and at least one hardware device 117. Examples of hardware devices 117 include network interface cards (NICs), sound or video adaptors, photo/video cameras, printer devices, keyboards, displays or any other suitable device intended to be coupled to a computer system.

Virtual machine (VM) computer systems, such as computer system 100, allow an application to be executed on any platform regardless of the underlying hardware or operating system. This can be accomplished by writing the application using managed code, commonly referred to as "bytecode," that is executed using virtual machine 120. A virtual machine can use an interpreter or a just-in-time (JIT) compiler to execute the bytecode. To run the application, the interpreter or JIT compiler can translate the bytecode into a form that is useable by the underlying hardware or operating system. Application code 126 may be the virtual machine readable bytecode of an application or any form that is useable by the underlying hardware or operating system.

The virtual machine 120 is a portion of software that can execute platform-independent bytecode in any programming language. Bytecode can be code in a standardized portable binary format that may be used, for example, to create an application. Bytecode can have the form of one or more class files (e.g., Java class files) and is executed by the virtual machine 120. In some implementations, multiple class files can be grouped together in a package, such as an archive file. Examples of archive files include Java archive (.jar) files, web archive (.war) files, etc.

The virtual machine 120 can be a Java Virtual Machine (JVM) that can execute bytecode in various programming languages, such as Java, Armed Bear Common Lisp, Clojure, Erjang, Fantom, Free Pascal, Gosu, Groovy, Jacl, JavaFX Script, JRuby, Jython, Kotlin, NetRexx, Processing, Quercus, Rhino, Scala, etc. In one implementation, JVM can execute application code 126 comprised of Java bytecode such as a Java class file, where the Java class file contains Java bytecode that can be executed on the JVM. An application may include one or multiple Java class files.

When virtual machine 120 executes an application, it can call upon application code 126, (e.g., bytecode). Application code 120 may be arranged as a series or group of instructions to execute a part or the whole of an application. Application code 126 may include bytecode from a bytecode library, bytecode from class files of the application, or bytecode from external sources. A bytecode loader, such as a Java class loader, can load standard bytecode from an object library into allocated storage for use by an application. For bytecode not included in the bytecode library, the bytecode loader can identify and obtain such bytecode from one or more external sources and load it into the allocated storage. Typically, bytecode can remain in the allocated storage until there are no applications that call upon the bytecode. A garbage collector can remove any unused bytecode.

When virtual machine 120 executes application code 126 containing a retain block 128, virtual machine 120 generates an instance of retain block manager 122 and an instance of retain block store 123. Retain block 128 represents a marked block of code. A marked block of code may be any software code delineated to be included in a retain block or retain statement. When an error occurs during the execution of code in the retain block 128, virtual machine 120 returns objects in retain block 128 back to the state in which the objects had been before the virtual machine 120 executed the code in retain block 128. Retain block manager 122 may monitor and manage the execution of retain block 128 by virtual machine 120. Retain block manager 122 determines prior to executing an instruction in the retain block 128, whether or not the instruction would cause the object to be modified. If the instruction is to cause the object to be modified, retain block manager 122 causes the original state of the object to be stored in retain block store 123. Aspects of retain block manger 122 will be further described in regards to FIGS. 3-10.

An object can be referred to a location in memory having at least one value and possibly referenced by an identifier. An object can be a variable, function, or data structure. In object-oriented programming, object refers to a particular instance of a class where the object can be a combination of variables, functions, and data structures. Objects have a state and behavior. An object's state is stored in fields (i.e., variables) and behavior is shown via methods.

For ease of illustration, Java programming language and related structures will be used as an example to describe the present invention. It should be borne in mind that the use of Java is for purposes of illustration and the present disclosure can apply to any language or associated virtual machine framework.

Figure 2:
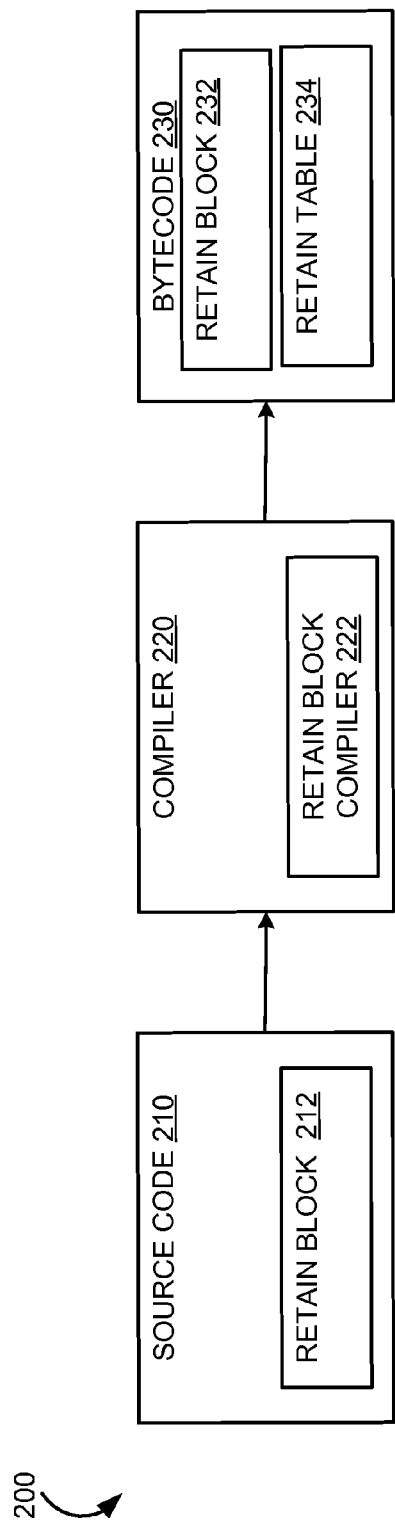
FIG. 2 is a block diagram of a compiling system, in accordance with some embodiments.

FIG. 2 is a block diagram of a compiling system 200, in accordance with some embodiments. As shown, source code 210 may be complied by compiler 220 to produce bytecode 230. Retain block 212 in source code 210 is compiled by retain block compiler 222 to produce retain block 232 in bytecode 230. Retain block 212 is the source code version of a retain block. Retain block 232 is the compiled version of retain block 212. Source code 210 of an application may be written in any programing language, for example Java programming language.

Table 1, below, is provided as an example of Java source code that implements a retain block (e.g., Table 1, lines 7-12), according to one embodiment. Class ManageOrders (i.e., line 1) contains method, addAllOrdersOrNothing (i.e., line 5), which loads a set of orders from a database and adds them into hashmap (i.e., line 3) of already loaded orders. Method addAllOrdersOrNothing at line six gets hashmap of all already loaded orders.

A developer may demarcate within the retain block (e.g., Table 1, lines 7-12), code that is to be performed as part of the retain block. The code within the retain block may be demarcated with braces, brackets, parenthesis, or any other programming convention. The code in the retain block may be performed atomically. When an error is detected, retain block may be canceled by throwing an exception, such as RetainException (Table 1, line 11). Alternatively, the retain block can be canceled when any unchecked exception is thrown inside the block. An error may be an abnormal condition while executing application code. The error may be detected by the VM120.

For example, in line 8 the while statement illustrates code contained in the retain block. When in the while cycle, the method addAllOrdersOrNothing can consecutively load orders from a database and add them into hashmap of all orders. At line 9, an order is loaded from database. At line 10, the program checks if the order is loaded correctly from database. If the order does not load correctly, then the exception, RetainException, can be thrown. Throwing an exceptions, such as RetainException, can cancel the retain block.

Each retain block may have at least one corresponding catch block (e.g., Table 1, lines 15-17). A catch block catches an exception (e.g., error) that is thrown while executing code in the retain block. When an exception is caught, contents of the catch block can be executed when an error occurs while executing code (i.e., instructions) in a retain block. For example, in Table 1, if an error occurs while executing the code in the retain block (e.g., Table 1, lines 7-12), RetainException can be thrown. The RetainException can cancel the retain block. If RetainException is caught by catch block (Table 1, lines 15-17), the contents of the catch block can execute. When the catch block (Table 1, lines 15-17) executes, the message "no orders have been added" can be displayed on a user device. When then retain block is canceled, i.e., an error occurs during the execution of code in the retain block, all objects that have been modified during the execution of code in the retain block return to the state before the retain block was executed. In the example in Table 1, canceling the retain block would result in restoration of objects to their original state so that the hashmap of all orders is not modified.

In one aspect of the disclosure, if an error occurs and an exception is thrown inside of the retain block and the exception is also caught in the retain block the retain block is not canceled. Instead, clean-up of the retain block may be performed. When an exception is thrown inside a retain block and caught inside the retain block both the exception code and catch is demarcated to be within the retain block. In another aspect of the disclosure, if the exception is caught outside of the retain block (see Table 1), the retain block is canceled. When the exception is caught outside of the retain block, the catch block may be demarcated to be outside the retain block.

TABLE 1

Source code with a retain block.

| | |
|---|---|
| 1. | public class ManageOrders{ |
| 2. | |
| 3. |    HashMap orders; |
| 4. | |
| 5. |    public void addAllOrdersOrNothing( ){ |
| 6. |      order=OrderSystem.getAlreadyLoadedOrders( ); |
| 7. |      retain { |
| 8. |        while(isNextOrderAvailable( )==true){ |
| 9. |          Order order=getNextOrderFromDatabase( ); |
| 10. |          if(order==null){ //order failed to load from database |
| 11. |            throw new RetainException( ); |
| 12. |          } |
| 13. |          orders.put(key, order); |
| 14. |        } |
| 15. |      }catch{ |
| 16. |        System.out.println("No orders has been added"); |
| 17. |      } |
| 18. |    } |
| 19. | } |

Table 2, below, is provided as an example of bytecode from the complied source code in Table 1. Table 2 shows bytecode method addAllOrdersOrNothing from Table 1. Numbers before the instructions indicate instruction offsets.

A Java complier may be modified to support a retain block (e.g., retain block 212). In FIG. 2, complier 220 has been modified to include the retain block compiler 222. Retain block compiler 222 uses retain block 212 from source code 210 to create a retain table (Table 2, bottom). The retain table is added to the class file. Retain table demarcates which bytecode instructions are part of the retain block. A retain table may be assigned to a method, such as method addAllOrdersOrNothing. Each line in the retain table indicate one retain block. In Table 2, the single line in the retain table indicates that there is one retain block associated with method addAllOrdersOrNothing. Multiple retain blocks may be associated with a method.

The retain table in Table 2 has three columns. The first column points to the offset where the retain block begins. The second column points to the offset where the retain block ends. The third column points to the offset where the corresponding catch block begins. In Table 2, the retain block begins at offset 7 (instruction goto 38) and ends at offset 45 (instruction goto 57). If the Retain block is canceled, a program counter can jump to the catch block which begins at offset 48.

Compiler 220 does not have to create new bytecode instructions to support a retain block. As such, the implementation of a retain block may be backwards compatible because VMs may not be required to load unknown bytecode instructions to support the retain block.

TABLE 2

Bytecode from complied source code in Table 1

```
public void addAllOrdersOrNothing( );
  flags: ACC_PUBLIC
  Code:
    stack=3, locals=2, args_size=1
       0: aload_0
       1: invokestatic  #17        // Method test/OrderSystem.getOrders:( )Ljava/util/HashMap;
       4: putField      #23        // Field orders:Ljava/util/HashMap;
       7: goto          38
      10: aload_0
      11: invokespecial #25        // Method getNextOrderFromDatabase:( )Ltest/Order;
      14: astore_1
      15: aload_1
      16: ifnonnull     27
      19: new           #29        // class java/lang/Exception
      22: dup
      23: invokespecial #31        // Method java/lang/Exception."<init>":( )V
      26: athrow
      27: aload_0
      28: getfield      #23        // Field orders:Ljava/util/HashMap;
      31: ldc           #32        // Sting key
      33: aload_1
      34: invokevirtual #34        // Method java/util/HashMap.put
      37: pop
      38: aload_0
      39: invokespecial #40        // Method isNextOrderAvailable:( )Z
      42: ifne          10
      45: goto          57
      48: astore_1
      49: getstatic     #44        // Field java/lang/System.out:Ljava/io/PrintStream;
      52: ldc           #50        // String No orders has been added
      54: invokevirtual #52        // Method java/io/PrintStream.println:(Ljava/lang/String;)V
      57: return
    Retain table:
    from to target
       7  45  48
```

Figure 3:
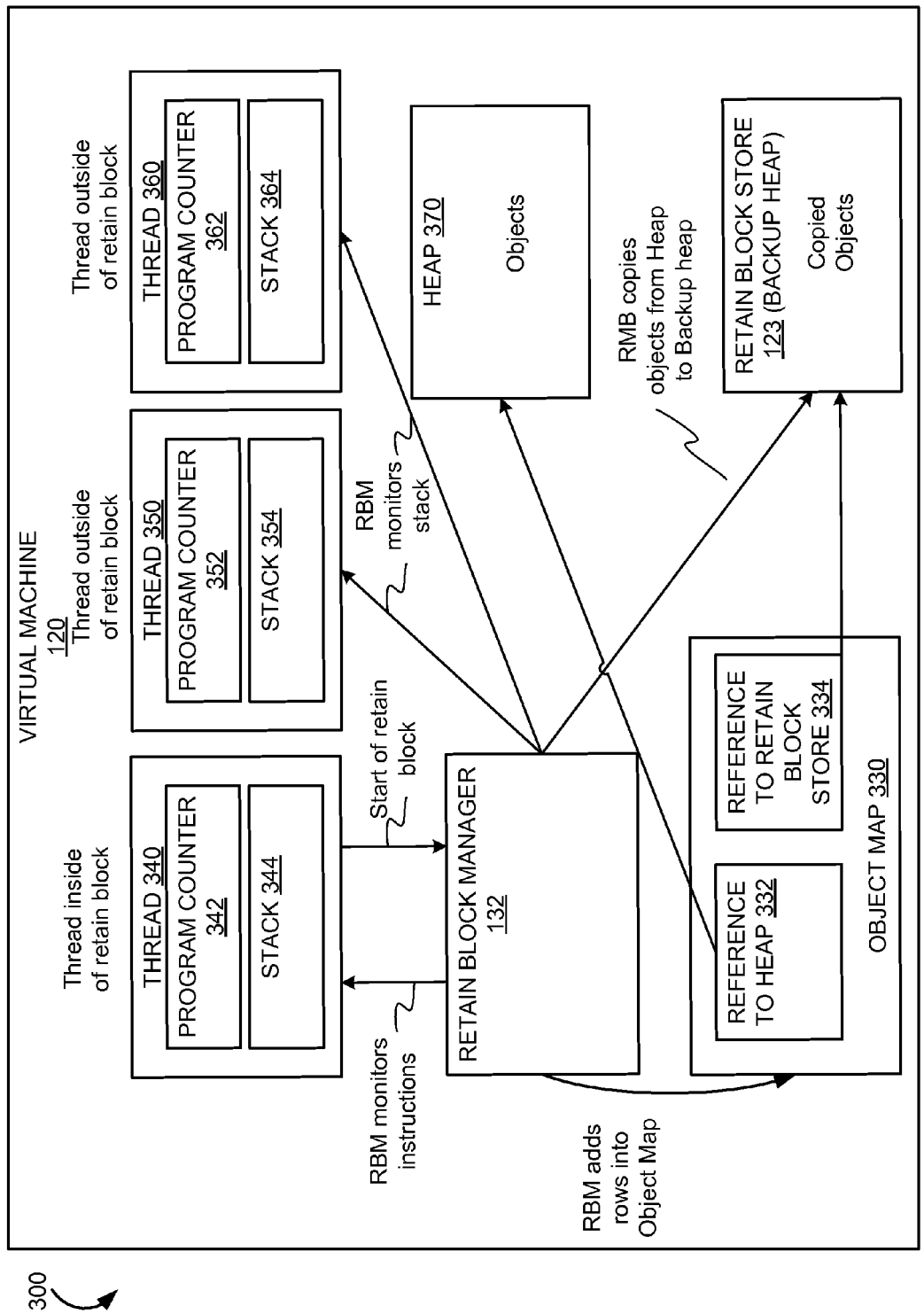
FIG. 3 is a block diagram of an example virtual machine in accordance with some embodiments.

FIG. 3 is a block diagram of an example virtual machine in accordance with some embodiments. Virtual machine 120 illustrates three threads: thread 340, thread 350, and thread 360. Each thread executes some portion of application code. In a VM, each thread can have its own stack and program counter (PC). For example, thread 340 contains program counter 342 and stack 344. Thread 350 contains program counter 352 and stack 354, while thread 360 contains program counter 362 and stack 364. In a VM environment, a heap, such as heap 370, can be shared among all threads and is used to store objects. Virtual machine 120 may be a Java virtual machine (JVM).

Virtual machine 120 is capable of supporting the execution of a retain block, in accordance with some aspects of the present disclosure. The virtual machine 120 may include retain block manager 132, retain block store 123 (e.g., backup heap), and object map 330. Retain block manager 132 can manage objects that are affected by a retain block. Retain block store 123 can store the original state of objects that are modified during the execution of code in the retain block. Object map 330 can link the above objects in the heap 370 and retain block store 123. For example, when an object in a retain block is modified, the modified object is stored in heap 370. The original unmodified object is stored in retain block store 123. Object keeps a reference of the modified object in reference to heap 332 and a reference to the original object in reference to retain block store. Both references may be pointers to memory locations of the object in the respective storage areas. Object map 330 can link the two references to the same object.

Before the bytecode instruction is executed by VM 120, VM 120 can access the retain table (Table 2, bottom) to check whether the offset of the instruction is within the offset range of the retain block. Said differently, VM 120 can check whether the offset of the instruction is between the value in FROM column and the value of the TO column of the retain table. If the bytecode instruction is within the offset range defined in the retain table, the thread of VM 120, in which the retain block started, can inform RBM 132 of the start of a retain block. For example, thread 340 contains a retain block. When an instruction indicating the start of the retain block pops off stack 344, thread 340 can notify RBM 132 that the execution of a retain block is about to begin. When RBM 132 receives the notification, RBM 132 can move the thread 340 into retain mode.

Upon moving thread 340 into retain mode, RBM 132 can create an empty retain block store 123 and an empty object map 330 for the new retain block. Each instance of a retain block may have its own retain block store and object map. Upon moving thread 340 into retain mode, RBM 132 may also stop the garbage collector (not shown). RBM 132 may pause the garbage collector when thread 340 is in retain mode. A garbage collector removes objects from the heap that are not reachable from any thread or are part of a static method. If the garbage collector were allowed to operate, the last reference to an object inside of a retain block may be removed from the heap 370 by the garbage collector. If the object were removed from heap 370, the object would be difficult to replace when the retain block is canceled.

When an error is detected while VM 120 is executing application code in a retain block, the retain block is canceled. When an error is detected an exception is thrown inside the retain block. In one embodiment, the detection of an error initiates the cancellation of the retain block. The exception may be caught or uncaught. The cancellation of the retain block can be performed as follows. If an exception is caught, VM 120 can jump into the catch block that is assigned to the retain block and execute the contents of the catch block. After the catch block is executed, RBM 132 can iterate through the object map 330 and replace objects in heap 370 with the corresponding objects in retain block store 123.

After RBM 132 performs the cancellation of the retain block, VM 120 can perform a clean-up of the retain block. In one embodiment, RBM 132 performs the clean-up. It should be noted that a clean-up may also be performed after VM 120 executes the entire retain block without encountering an error. In such a case, the retain block is not canceled and the original states of the objects are not restored. When performing clean-up, RBM 132 destroys retain block store 123 and object map 330. RBM 132 also restarts the garbage collector. RBM 132 removes the thread 340 from retain mode. Additionally, RBM 132 restarts any thread which was suspended during the execution of the retain block.

VM 120 may execute many threads in a multi-thread environment. Multiple threads are illustrated by thread 350 and thread 360. These other threads may or may not execute application code containing a retain block. If the other threads do execute an instance of a retain block, VM 120 can initiate a separate RBM for each new instance of a retain block. The separate RBM can initiate a separate instance of an object map and retain block store for the new instance of a retain block.

In a multi-thread environment when a retain block is initiated, RBM 132 can monitor all other threads being executed by VM 120. RBM 132 can monitor the other threads so that objects in the retain block are not disrupted by the other threads. The other threads do not necessarily read or modify objects that are in retain mode. But in order to protect against other threads modifying objects that are in retain mode, RBM 132 can monitor the stacks of all threads (e.g., stack 354 and stack 364) and compare object references on top of the stacks of the other threads with the object map 330. If the object reference found on top of a stack (e.g., stack 354 and stack 364) equals the object reference in object map 330, RBM 132 can suspend the execution of other thread until the current retain block is canceled or finishes executing.

In one embodiment, RBM 132 contains an instruction list (not shown). The instruction list may contain bytecode instructions that modify objects. Additionally, the instruction list may contain instructions that modify arrays. Arrays are objects in Java. Some examples bytecode instructions that may be contained in the instruction list include: putfield, putstatic, aastore, bastore, castore, dastore, fastore, iastore, lastore, sastore.

FIGS. 4 through 9 illustrate methods utilizing a retain block in accordance with various aspects of the present disclosure. The methods may be performed by processing logic that may include hardware (e.g., circuitry, dedicated logic, programmable logic, microcode, etc.), software (e.g., instructions run on a processing device to perform hardware simulation), or a combination thereof. The methods may be performed by the computer system 100 of FIG. 1.

Figure 4:
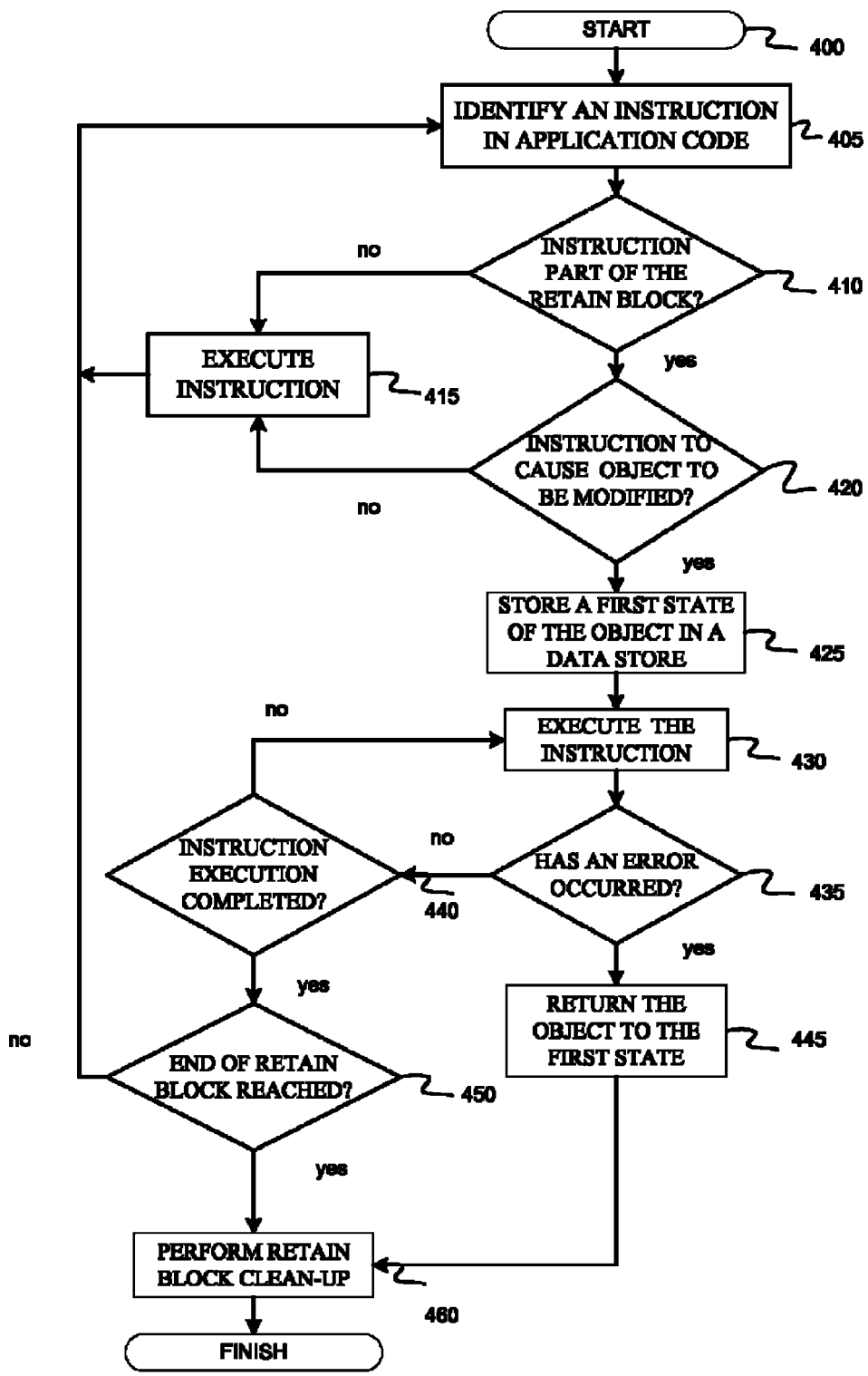
FIG. 4 is a flow diagram illustrating a method for using a retain block in application code executing on a virtual machine, in accordance with an embodiment.

FIG. 4 is a flow diagram illustrating a method for using a retain block in application code executing on a virtual machine, in accordance with an embodiment. Features of FIG. 1 and FIG. 3 may be referenced for purposes of illustration. Method 400 begins at block 405 where processing logic identifies an instruction in application code 126. The application code 126 may be bytecode. The application code 126 may contain one or more instructions. The instructions may be bytecode instructions. The application code 126 may be executable by VM 120. Alternatively, VM 120 may interpret application code 126 and translate application code 126 in a form readable by VM 120.

At block 410, processing logic determines if the instruction is part of a retain block. In order to determine if the instruction is part of a retain block processing logic determines the offset of the instruction and compares the offset of the instruction to an offset range defined in the retain table. An example retain table is described in more detail in regards to FIG. 2, Table 2. Aspects of the determination by processing logic if the instruction is part of the retain block is described in more detail in regards to FIG. 6.

If processing logic determines that the instruction is not part of the retain block, processing logic executes the instruction (block 415). If processing logic determines that the instruction is part of the retain block, processing logic determines if the instruction is to cause the object to be modified (block 420). If an object is to be modified, the state of the object is to change from an original state to a modified state. The original state may be the state of the object prior to entering the retain block.

If processing logic determines that the instruction will not cause the object to be modified, processing logic executes the instruction (block 415). If processing logic determines that the instruction is to cause the object to be modified, processing logic stores the state of the object in a data store, such as retain block store 123 (block 425), as can be further discussed in regards to FIG. 3 and FIG. 7.

At block 430, processing logic executes the instruction. During the execution of the instruction, processing logic monitors if an error occurs during the execution of the instruction. The execution of the instruction may occur during runtime. At block 435, processing logic monitors the execution of the instruction for an error. Also during execution of the instruction, at block 440, processing logic determines if the execution of the instruction is completed. If the execution of the instruction is not complete, processing logic continues to execute the instruction and monitor if an error occurs as shown in block 430 and 435, respectively.

Figure 8:
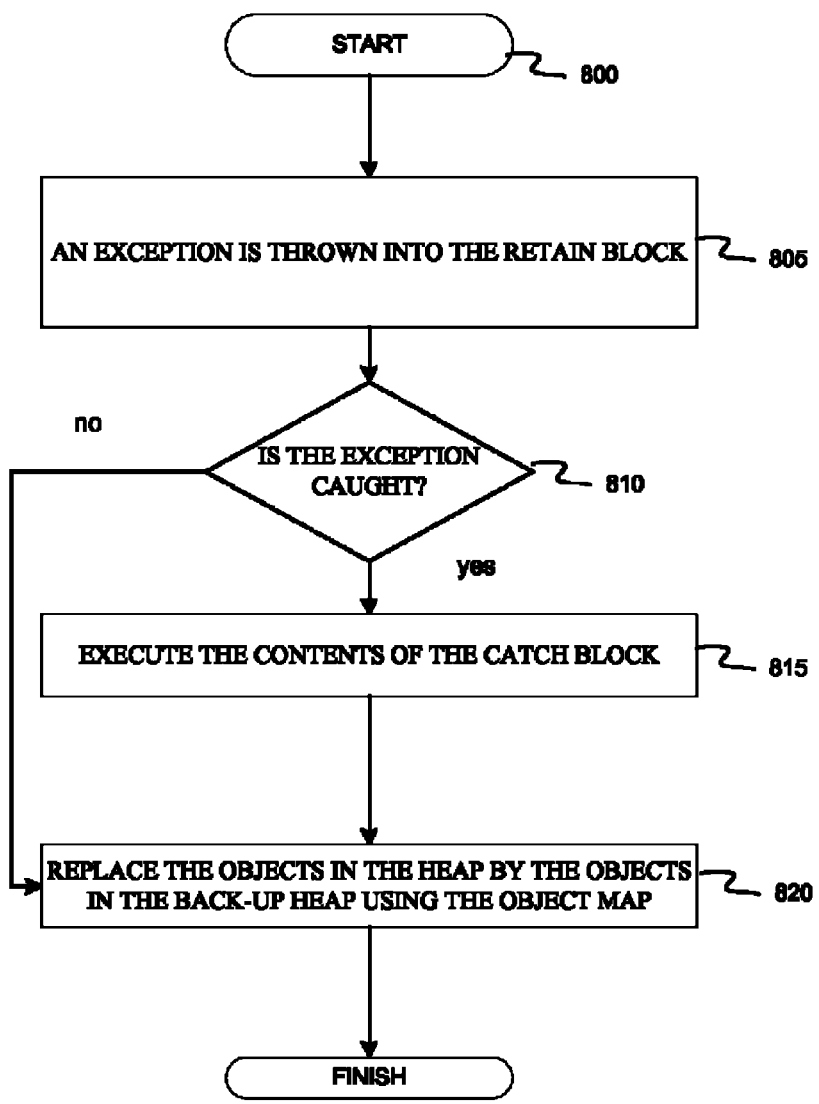
FIG. 8 is a flow diagram illustrating a method for using a retain block in application code executing on a virtual machine, in accordance with another embodiment.

If an error occurs during the execution of an instruction, processing logic returns the objects in the retain block to the original state (e.g., first state) (block 445), as can be further discussed in regards to FIG. 3 and FIG. 8. Returning the object to the original state can also be referred to as canceling the retain block.

If no error occurs during the execution of the instruction and the execution of the instruction is completed, processing logic determines if the end of the retain block has been reached (block 450). In order to make the determination, processing logic compares the offset of the instruction just completed to offset range defined in the retain table. If processing logic determines that the end of the retain block has not been reached, method 400 returns to block 405 where processing logic identifies the next instruction.

If the end of the retain block has been reached, method 400 continues to block 460. Alternatively, if processing logic returns the object to the original state (block 445, also called canceling the retain block, method 400 also continues to block 460 where processing logic performs clean-up, as can be further discussed in regards to FIG. 3 and FIG. 9.

Figure 5:
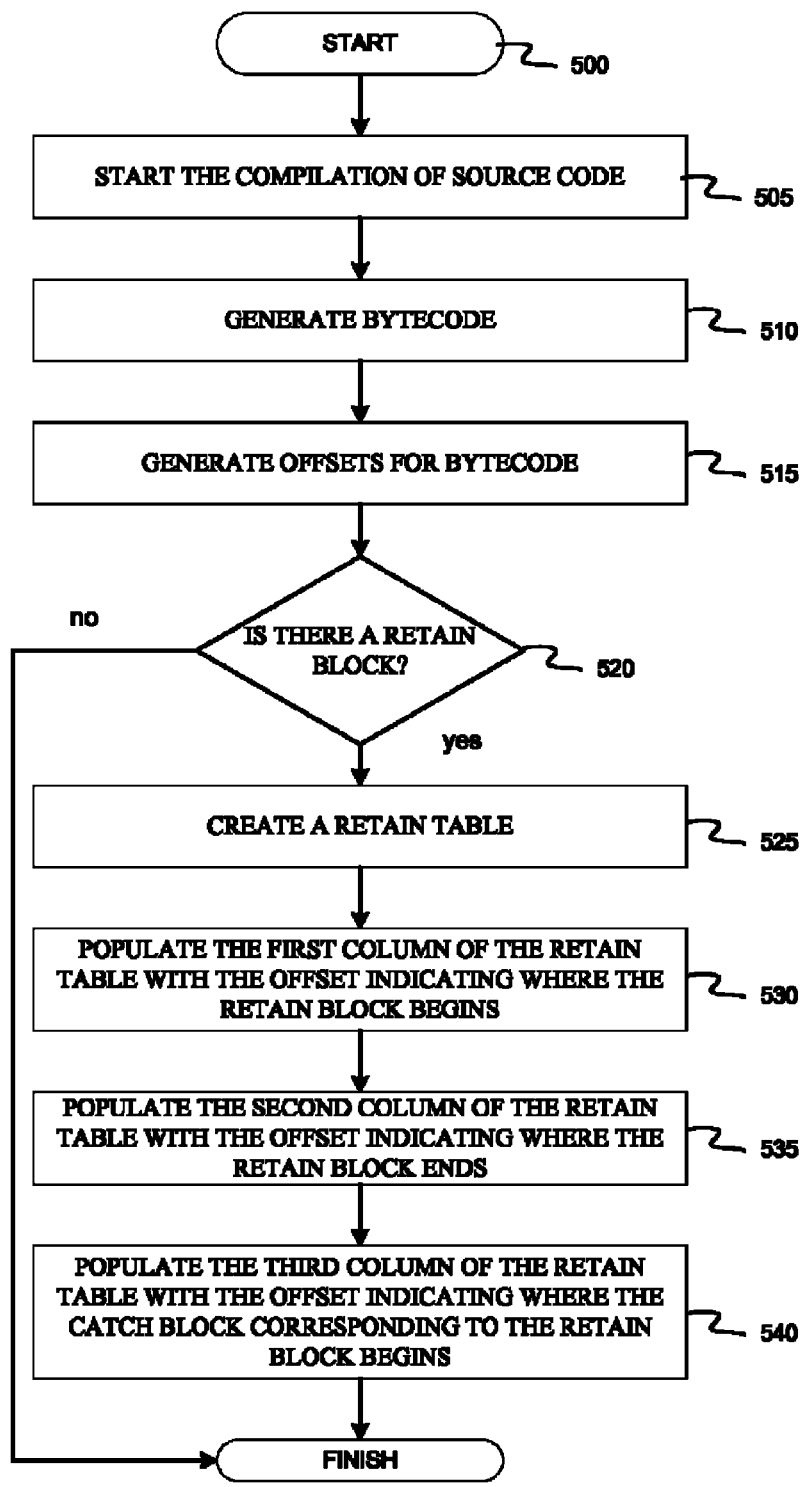
FIG. 5 is a flow diagram illustrating a method for compiling source code containing a retain block, in accordance with an embodiment.

FIG. 5 is a flow diagram illustrating a method 500 for compiling source code containing a retain block, in accordance with an embodiment. Method 500 can be performed by compiling system 200 of FIG. 2. Method 500 begins at block 505 where processing logic starts the compilation of source code 210. In block 510, processing logic generates bytecode 230 from the source code 210. The source 210 code may be compiled into one or more bytecode instructions. In block 515, processing logic generates offsets for the bytecode 230. Each offset may be associated with a corresponding instruction. Offsets may be used as an index for bytecode and bytecode instructions.

Method 500 continues to block 520, where processing logic determines if the source code 210 contains a retain block. An example of retain block 212 in source code 210 is illustrated in Table 1. If processing logic determines there is no retain block 212 in source code 210, method 500 ends.

If processing logic does determine that a retain block 212 exists in source code 210, method 500 moves to block 525 where processing logic creates a retain table. An example retain table is illustrated in Table 2. The retain table defines the offsets where the retain block starts and where the retain block ends. These two offsets delineate an offset range corresponding to instructions in the retain block. Additionally, the retain table includes the offset where the catch block begins.

At block 530, processing logic populates the first column of the retain table with the offset indicating where the retain table begins. At block 535, processing logic populates the second column of the retain table with the offset indicated where the retain block ends. At block 540, processing logic populates the third column of the retain table with the offset indicating where the catch block, corresponding to the retain block, begins. An example retain table can be further described in regards to FIG. 2.

Figure 6:
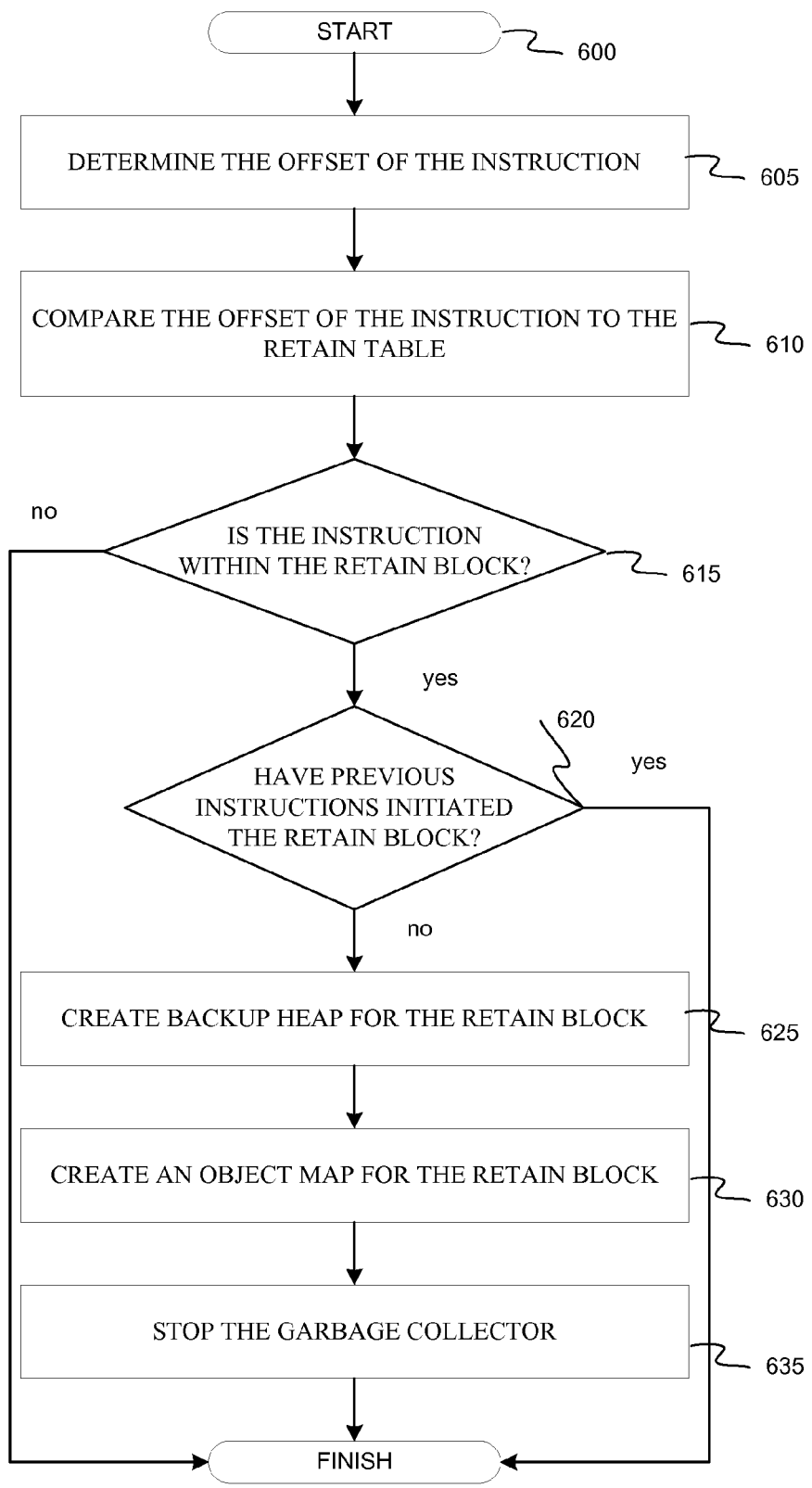
FIG. 6 is a flow diagram illustrating a method for using a retain block in application code executing on a virtual machine, in accordance with another embodiment.

FIG. 6 is a flow diagram illustrating a method for using a retain block in application code executing on a virtual machine, in accordance with another embodiment. Specifically, FIG. 6 can illustrate method 600 for determining whether an instruction is part of a retain block.

Method 600 begins at block 605 where processing logic determines the offset of the instruction. Processing logic may look to the bytecode to determine the offset. At block 610, processing logic compares the offset of the instruction to the retain table. As noted above, the retain table includes the offset range of bytecode included in a retain block. In block 615, processing logic determines if the instruction is within the retain block. Processing logic may compare the offset of the instruction to the offset range in the retain table. If the offset of the instruction is outside the offset range, method 600 ends.

If the offset of the instruction is within the retain block, processing logic determines if previous instruction initiated the retain block (block 620). If a previous instruction has initiated an instance of the retain block, method 600 ends. If the offset of the instruction is at the start of the retain block, processing logic may determine that previous instructions have not initiated the retain block.

If the retain block has not been initiated, method 600 moves to block 625 where processing logic creates a retain block store 123 (backup heap) for the instance of the retain block. At block 630, processing logic creates an object map for the retain block. At block 635, processing logic stops the garbage collector.

Figure 7:
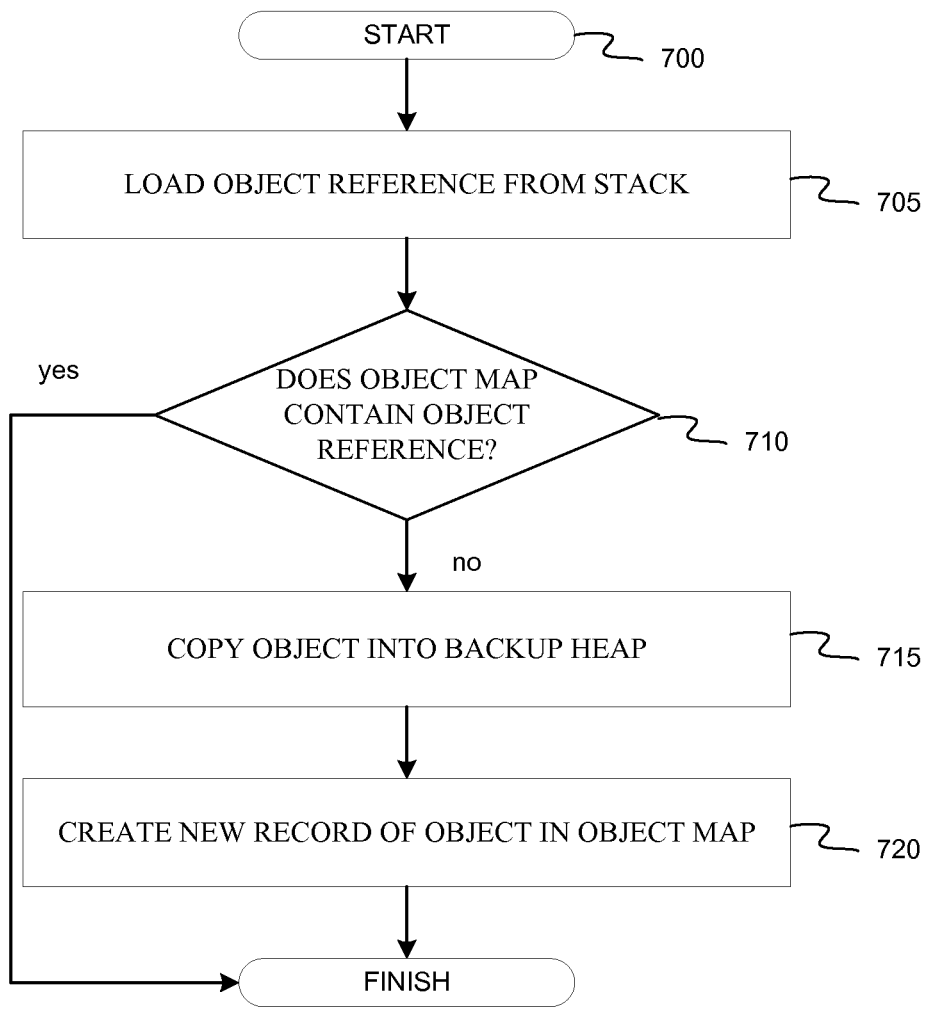
FIG. 7 is a flow diagram illustrating a method for using a retain block in application code executing on a virtual machine, in accordance with another embodiment.

FIG. 7 is a flow diagram illustrating a method for using a retain block in application code executing on a virtual machine, in accordance to another embodiment. Specifically, FIG. 7 illustrate method 700 for storing the original state of the object in the retain block store 123.

Method 700 begins at block 705 where processing logic loads an object reference from stack 344. An object reference may be a pointer to an object. At block 710, processing logic determines if the object map 330 contains the object reference loaded from stack 344. Processing logic may look in reference to retain block store 334 to determine if object map 330 contains the object reference of stack 344. If object map 330 contains the object reference, processing logic determines that the original state of the object has already been stored and method 700 ends.

If object map 330 does not contain the object reference, method 700 proceeds to block 715 where processing logic makes a copy of the object on retain block store 123. The copy of the object may be the state of the object prior to processing logic executing the retain block. At block 720, processing logic creates a new record of the object in object map 330. The new record may include a key, an object reference of the modified object to be stored in heap 370 and a value, an object reference of the original or cloned object to be stored in the retain block store 123. Processing logic may link the key and the value.

FIG. 8 is a flow diagram illustrating a method for using a retain block in application code executing on a virtual machine, in accordance with another embodiment. Specifically, FIG. 8 illustrates a method 800 for returning the object to the original state.

Method 800 begins at block 805. When processing logic determines an error occurred executing application code in the retain block, processing logic throws an exception into the retain block. An example of throwing an exception is further described in regards to Table 1. Throwing an exception indicates an abnormality has occurred while VM 120 executed an instruction.

At block 810, processing logic determines if the exception is caught. In Java an exception may be caught or uncaught. If a catch block is contained in the application code, and is structured to catch the specific exception, the exception is said to be caught. If no catch block exists to catch the particular exception, a thread may be terminated.

If the exception is caught, method 800 proceeds to block 815 where processing logic executes the contents of the catch block. At block 820, processing logic replaces the objects in the heap 370 with the objects in the retain block store 123 by using object map 330. When the objects are replaced, the modified objects in heap 370 are replaced with the original objects from retain block store 123.

Figure 9:
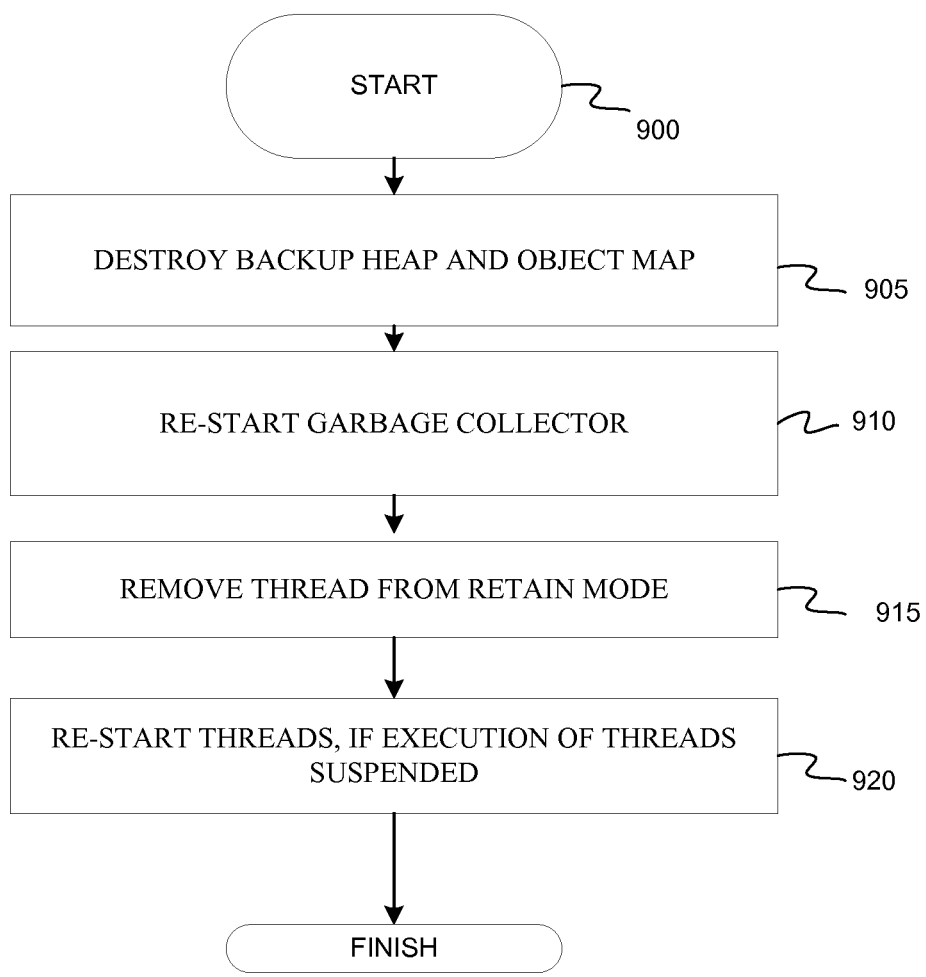
FIG. 9 is a flow diagram illustrating a method for using a retain block in application code executing on a virtual machine, in accordance with another embodiment.

FIG. 9 a flow diagram illustrating a method for using a retain block in application code executing on a virtual machine, in accordance with another embodiment. Specifically, FIG. 9 illustrates method 800 for performing retain block clean-up.

Method 900 begins at block 905 where processing logic destroys retain block store 123 and object map 330. At block 910, processing logic restarts the garbage collector. At block 915, processing logic removes thread 340 from retain mode. At block 920, processing logic restarts any threads that were suspended while executing the retain block. Clean-up is further described in regards to FIG. 3.

Figure 10:
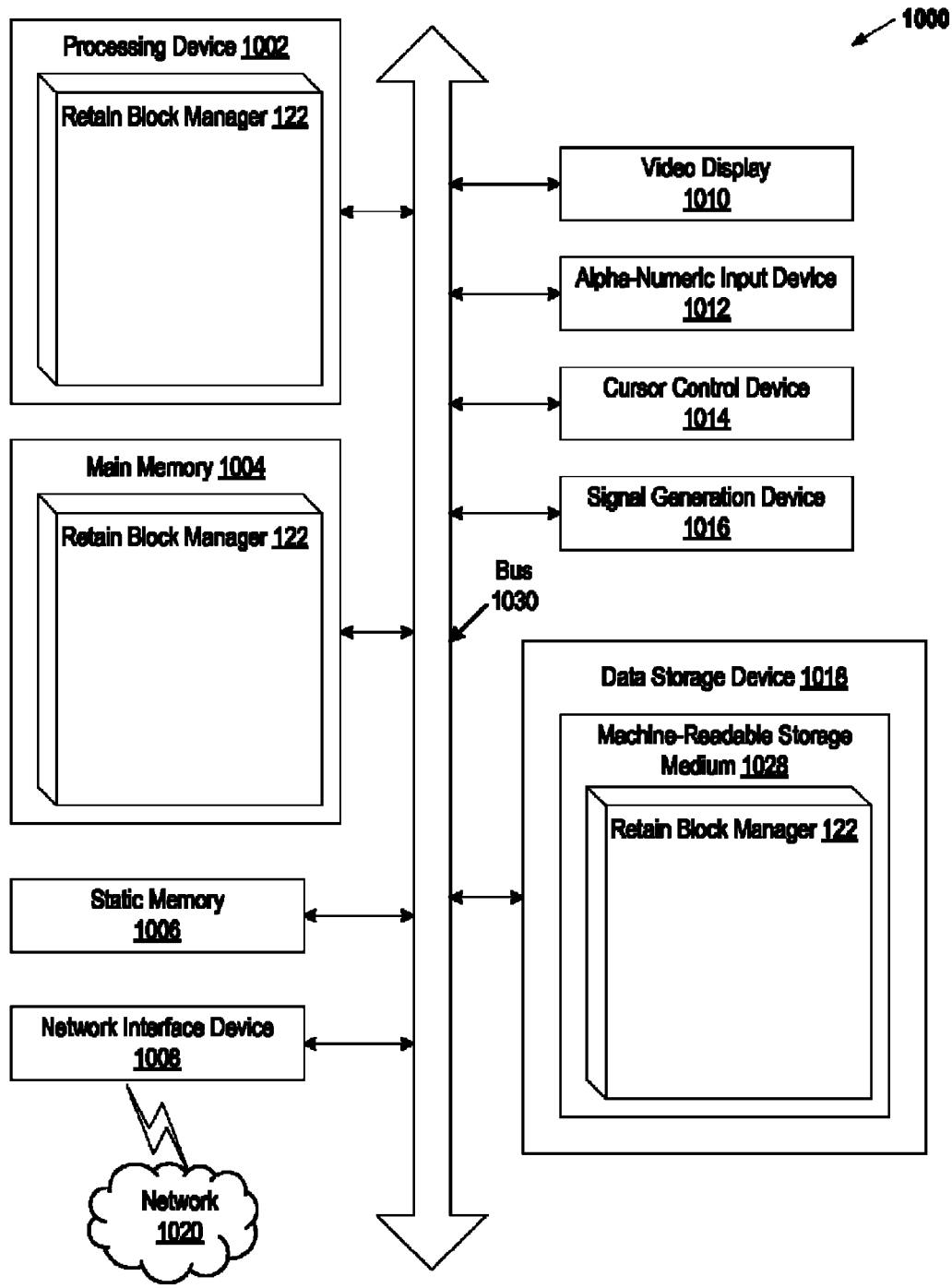
FIG. 10 illustrates a diagrammatic representation of a machine in the form of a computer system, in accordance with an embodiment.

FIG. 10 illustrates a diagrammatic representation of a machine in the form of a computer system, in accordance with an embodiment. In alternative example embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 1000 includes a processing device 1002, a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which communicate with each other via a bus 1030.

The processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute retain block manager 122 for performing the operations and steps discussed herein.

The computer system 1000 may further include a network interface device 1008. The network interface device 1008 may be in communication with a network 1020. The computer system 1000 also may include a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a computer-readable storage medium (or more specifically a non-transitory computer-readable storage medium) 1028 on which is stored one or more sets of VM operating instructions for the retain block manager 122 embodying any one or more of the methodologies or functions described herein. The VM operating instructions for the retain block manager 122 may also reside, completely or at least partially, within the main memory 1004 and/or within the processing device 1002 during execution thereof by the computer system 1000, the main memory 1004 and the processing device 1002 also constituting computer-readable storage media. The VM operating instructions for retain block manager 122 may further be transmitted or received over a network via the network interface device 1008.

While the computer-readable storage medium 1028 is shown in an example embodiment to be a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   determining, by a processing device executing a virtual machine, an instruction in application code is part of a retain block, wherein the instruction pertains to an object;
   prior to executing the instruction, determining whether the instruction is to cause the object to be modified, and when the instruction is to cause the object to be modified, storing data indicating a first state of the object in a retain block store and causing the first state of the object to be modified using a second state; and
   in response to an error occurring during an execution of the instruction, returning the object from the second state to the first state using the stored data.

2. The method of claim 1, wherein determining the instruction is part of the retain block further comprising:
   determining an offset of the instruction;
   comparing the offset of the instruction to an offset range defined in a retain table; and
   in response to the offset of the instruction indicting that the instruction is within the offset range:
      creating the retain block store for the retain block;
      creating an object map for the retain block; and
      stopping a garbage collector.

3. The method of claim 1, wherein storing the first state of the object in the retain block store further comprising:
   loading an object reference associated with the instruction from a stack;
   determining whether an object map contains the object reference; and
   in response to determining the object map does not contain the object reference:
      copying the object into the retain block store; and
      creating a new record of the object in an object map.

4. The method of claim 1, wherein returning the object to the first state further comprises:
   throwing an exception into the retain block in response to the error;
   in response to catching the exception, executing contents of a catch block; and
   replacing a modified object in a heap with the first state of the object.

5. The method of claim 1, further comprising:
   performing, by the processing device executing the virtual machine, a clean-up of the retain block.

6. The method of claim 1, wherein the error comprises an uncaught exception thrown inside of the retain block.

7. The method of claim 1, wherein the instruction is part of a thread in a multi-thread environment.

8. The method of claim 1, wherein the virtual machine is a JAVA™ virtual machine.

9. A non-transitory computer readable storage medium including instructions that, when executed by a processing device, the processing device to:
   determine, by the processing device executing a virtual machine, an instruction in application code is part of a retain block, wherein the instruction pertains to an object;
   prior to executing the instruction, determine whether the instruction is to cause the object to be modified, and when the instruction is to cause the object to be modified, store data indicating a first state of the object in a retain block store and cause the first state of the object to be modified using a second state; and in response to an error occurring during an execution of the instruction, return the object from the second state to the first state using the stored data.

10. The non-transitory computer readable storage medium of claim 9, wherein to determine the instruction is part of the retain block the processing device further to:
   determine an offset of the instruction;
   compare the offset of the instruction to an offset range defined in a retain table; and
   in response to the offset of the instruction indicating that the instruction is within the offset range:
      create the retain block store for the retain block;
      create an object map for the retain block; and
      strop a garbage collector.

11. The non-transitory computer readable storage medium of claim 9, wherein to store the first state of the object in the retain block store the processing device further to:
   load an object reference associated with the instruction from a stack;
   determine whether an object map contains the object reference; and
   in response to determining the object map does not contain the object reference:
      copy the object into the retain block store; and
      create a new record of the object in an object map.

12. The non-transitory computer readable storage medium of claim 9, wherein to return the object to the first state the processing device further to:
   throw an exception into the retain block in response to the error;
   in response to catching the exception, execute contents of a catch block; and
   replace a modified object in a heap with the first state of the object.

13. The non-transitory computer readable storage medium of claim 9, the processing device further to:
   perform, by the processing device executing the virtual machine, a clean-up of the retain block.

14. A system comprising:
   a memory;
   a processing device communicably coupled to the memory and to execute a virtual machine, the processing device to:
      determine, by a processing device executing a virtual machine, an instruction in application code is part of a retain block, wherein the instruction pertains to an object;
      prior to executing the instruction, determine whether the instruction is to cause the object to be modified, and when the instruction is to cause the object to be modified, store data indicating a first state of the object in a retain block store and cause the first state of the object to be modified using a second state; and
      in response to an error occurring during an execution of the instruction, return the object from the second state to the first state using the stored data.

15. The system of claim 14, wherein to determine the instruction is part of the retain block the system further to:
   determine an offset of the instruction;
   compare the offset of the instruction to an offset range defined in a retain table; and
   in response to the offset of the instruction indicating that the instruction is within the offset range:
      create the retain block store for the retain block;
      create an object map for the retain block; and
      stop a garbage collector.

16. The system of claim 14, wherein to store the first state of the object in the retain block store the system further to:
   load an object reference associated with the instruction from a stack;
   determine whether an object map contains the object reference; and
   in response to determining the object map does not contain the object reference:
      copy the object into the retain block store; and
      create a new record of the object in an object map.

17. The system of claim 14, wherein to return the object to the first state the system further to:
   throw an exception into the retain block in response to the error;
   in response to catching the exception, execute contents of a catch block; and
   replace a modified object in a heap with the first state of the object.

18. The system of claim 14, further to:
   perform, by the processing device executing the virtual machine, a clean-up of the retain block.

19. The system of claim 14, wherein the virtual machine is a JAVA™ virtual machine.

* * * * *